United States Patent
Anders et al.

(10) Patent No.: US 10,372,426 B2
(45) Date of Patent: *Aug. 6, 2019

(54) COGNITIVE REDUNDANT CODING CORPUS DETERMINATION SYSTEM

(71) Applicant: International Business Machines Corporation, Armonk, NY (US)

(72) Inventors: Kelley Anders, East New Market, MD (US); Lisa Seacat DeLuca, San Francisco, CA (US); Jeremy R. Fox, Georgetown, TX (US); Rick A. Hamilton, II, Charlottesville, VA (US)

(73) Assignee: International Business Machines Corporation, Armonk, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 15/804,522

(22) Filed: Nov. 6, 2017

(65) Prior Publication Data

US 2019/0138278 A1     May 9, 2019

(51) Int. Cl.
*G06F 8/33*     (2018.01)
*G06F 8/36*     (2018.01)
*G06F 16/903*   (2019.01)

(52) U.S. Cl.
CPC ............ *G06F 8/36* (2013.01); *G06F 8/33* (2013.01); *G06F 16/903* (2019.01)

(58) Field of Classification Search
CPC .......... G06F 8/33; G06F 8/36; G06F 8/70–77; G06F 17/301; G06F 17/30864; G06F 16/144–156; G06F 16/33–338; G06F 16/83–838; G06F 16/903–9038; G06F 16/953–9538
USPC .......... 717/120–123; 707/706–707
See application file for complete search history.

(56) References Cited

U.S. PATENT DOCUMENTS

| | | | |
|---|---|---|---|
| 6,226,792 B1 | 5/2001 | Goiffon et al. | |
| 6,256,773 B1 | 7/2001 | Bowman-Amuah | |
| 6,662,357 B1 | 12/2003 | Bowman-Amuah | |
| 7,197,497 B2 * | 3/2007 | Cossock | G06F 17/30702 |
| 7,673,234 B2 * | 3/2010 | Kao | G06F 17/30707 715/255 |
| 8,108,844 B2 | 1/2012 | Crutchfield et al. | |
| 8,498,987 B1 * | 7/2013 | Zhou | G06F 17/30946 707/741 |
| 8,688,676 B2 * | 4/2014 | Rush | G06F 8/36 707/706 |
| 8,732,660 B2 * | 5/2014 | Neill | G06F 17/276 707/E17.138 |

(Continued)

OTHER PUBLICATIONS

Anonymous, "Does a Third-Party Library Make You More Efficient as a Developer", Consultant Specialists, Inc [online], 2017 [retrieved Nov. 1, 2018], Retrieved from Internet: <URL: http://www.csi-it.com/2017/07/07/third-party-library-make-efficient-developer/>, pp. 1-3.*

(Continued)

*Primary Examiner* — Todd Aguilera
(74) *Attorney, Agent, or Firm* — Brown & Michaels, PC; Nicholas Bowman

(57) ABSTRACT

A system dynamically assesses computer code as it is constructed to determine if there is better wording for the code, a more efficient way of writing that code, or preferred code or programming language based on a set of predetermined factors and then proposes the best resource for obtaining that piece of code. The predetermined factors may include, but are not limited to an enterprise's policy, and business rules.

7 Claims, 3 Drawing Sheets

(56) References Cited

U.S. PATENT DOCUMENTS

| | | | |
|---|---|---|---|
| 9,009,565 B1 | 4/2015 | Northcott et al. | |
| 2003/0172357 A1* | 9/2003 | Kao | G06F 17/30707 |
| | | | 715/256 |
| 2004/0215606 A1* | 10/2004 | Cossock | G06F 17/30702 |
| 2010/0106705 A1* | 4/2010 | Rush | G06F 8/36 |
| | | | 707/709 |
| 2012/0198419 A1* | 8/2012 | Neill | G06F 17/276 |
| | | | 717/109 |
| 2014/0013308 A1* | 1/2014 | Gounares | H04L 41/0806 |
| | | | 717/125 |

OTHER PUBLICATIONS

"Tool to promote code reuse and avoid code duplication", an IP.com Prior Art Database Technical Disclosure, IP.com No. IPCOM000197782D; Jul. 2010.

Microsoft et al. "Applying concept analysis on method invocations to find usage patterns and code duplication", an IP.com Prior Art Database Technical Disclosure, IP.com No. IPCOM000228095D; Jun. 2013.

"Type-inferencing/checking for dynamically-typed languages such as Python", an IP.com Prior Art Database Technical Disclosure, IP.com No. IPCOM000231482D; Oct. 2013.

"A system and method to assess programming language proficiency", an IP.com Prior Art Database Technical Disclosure, IP.com No. IPCOM000243771D; Oct. 2015.

Daloze et al. "Efficient and Thread-Safe Objects for Dynamically-Typed Languages", OOPSLA'16, Nov. 2-4, 2016, Amsterdam, Netherlands.

https://www.codacy.com/ at least as early as Jan. 2017.

* cited by examiner

COGNITIVE REDUNDANT CODING CORPUS DETERMINATION SYSTEM

BACKGROUND

The present invention relates to organization of access to computer code across an enterprise, and more specifically to methods of increasing efficiency by providing improved access to a library of computer code.

In large companies where there are multiple business units with multiple product development teams, there is not necessarily one centrally located code repository. It's quite possible that redundant features, functionality and duplicate code is being written on a daily basis. While there currently are code catalogs which contain many services and APIs for programming reuse, there is no way to dynamically determine what is already present and available based on the requirements of the architecture desired as dictated by the company or the application in which the code is to be applied.

SUMMARY

According to one embodiment of the present invention, a method of analyzing code in a programming language entered by a user into a computer for an enterprise is disclosed. The method comprising the steps of: a) the computer receiving code from the user; b) the computer providing the code to a search engine to execute a search of the code received from the user within at least one repository; c) the computer receiving at least one result from the search engine, the at least one result comprising at least one computer code segment; d) the computer comparing the programming language used in the at least one result to the programming language of the code entered by the user to determine if there is a match; e) if the computer determines that there is a match, the computer displaying a suggested new code segment to the user from the at least one search result; f) the computer receiving a response from the user to accept or reject the new code segment suggested in step (e); and g) if the computer receives a response from the user to accept the new code segment, the computer replacing the code received from the user with the new code segment.

According to another embodiment of the present invention, a computer program product for analyzing code in a programming language entered by a user into a computer for an enterprise by a computer. The computer comprising at least one processor, one or more memories, one or more computer readable storage media, the computer program product comprising a computer readable storage medium having program instructions embodied therewith. The program instructions executable by the computer to perform a method comprising: a) receiving, by the computer, code from the user; b) providing, by the computer, the code to a search engine to execute a search of the code received from the user within at least one repository; c) receiving, by the computer, at least one result from the search engine, the at least one result comprising at least one computer code segment; d) comparing, by the computer, the programming language used in the at least one result to the programming language of the code entered by the user to determine if there is a match; e) if the computer determines that there is a match, displaying, by the computer, a suggested new code segment to the user from the at least one search result; f) receiving, by the computer, a response from the user to accept or reject the new code segment suggested in step (e); and g) if the computer receives a response from the user to accept the new code segment, replacing, by the computer, the code received from the user with the new code segment.

According to another embodiment of the present invention, a computer system for analyzing code in a programming language entered by a user into a computer for an enterprise is disclosed. The computer system comprising a computer comprising at least one processor, one or more memories, one or more computer readable storage media having program instructions executable by the computer to perform the program instructions. The program instructions comprising: a) receiving, by the computer, code from the user; b) providing, by the computer, the code to a search engine to execute a search of the code received from the user within at least one repository; c) receiving, by the computer, at least one result from the search engine, the at least one result comprising at least one computer code segment; d) comparing, by the computer, the programming language used in the at least one result to the programming language of the code entered by the user to determine if there is a match; e) if the computer determines that there is a match, displaying, by the computer, a suggested new code segment to the user from the at least one search result; f) receiving, by the computer, a response from the user to accept or reject the new code segment suggested in step (e); and g) if the computer receives a response from the user to accept the new code segment, replacing, by the computer, the code received from the user with the new code segment.

DETAILED DESCRIPTION

It will be recognized that according to an embodiment of the present invention, a system dynamically assesses computer code as it is constructed to determine if there is better wording for the code, a more efficient way of writing that code, or preferred code or programming language based on a set of predetermined factors and then proposes the best resource for obtaining that piece of code. The predetermined factors may include, but are not limited to an enterprise's policy, and business rules.

The system creates a service to dynamically predict multiple options or alternatives for code reuse and languages supported through a decision tree approach for requirements. The decision tree could be a series of if-then-else statements, case statements, or statistical analysis in social science. Furthermore, the decision tree can use decision tree algorithms such as Classification and Regression tree (CART), a Chi-square Automatic Interaction Detector (CHAID), Quick, Unbiased, Efficient Statistical Tree (QUEST), and C5.0.

In addition, the system can combine code and language search results from sources both internal to the enterprise (i.e. proprietary) and also from external open data sources.

The system encourages code reuse and aids in maintaining consistency in code drafting and implementation across an enterprise, increasing the efficiency of implementing the code in an enterprise.

Figure 1:
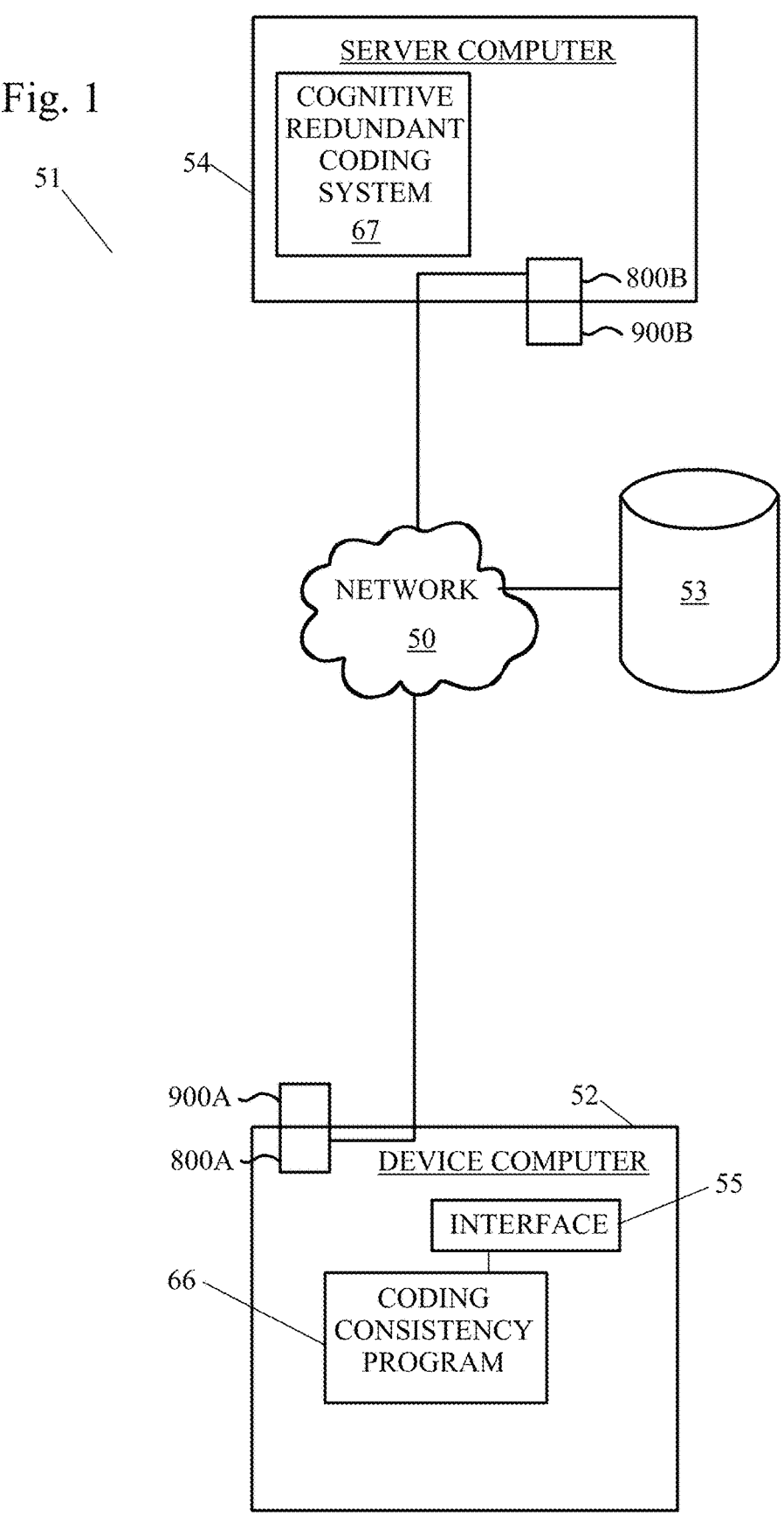
FIG. 1 depicts an exemplary diagram of a possible data processing environment in which illustrative embodiments may be implemented.

FIG. 1 is an exemplary diagram of a possible data processing environment provided in which illustrative embodiments may be implemented. It should be appreciated that FIG. 1 is only exemplary and is not intended to assert or imply any limitation with regard to the environments in which different embodiments may be implemented. Many modifications to the depicted environments may be made.

Referring to FIG. 1, network data processing system 51 is a network of computers in which illustrative embodiments may be implemented. Network data processing system 51 contains network 50, which is the medium used to provide communication links between various devices and computers connected together within network data processing system 51. Network 50 may include connections, such as wire, wireless communication links, or fiber optic cables.

In the depicted example, device computer 52, a repository 53, and a server computer 54 connect to network 50. In other exemplary embodiments, network data processing system 51 may include additional client or device computers, storage devices or repositories, server computers, and other devices not shown.

The device computer 52 may contain an interface 55, which may accept commands and data entry from a user. The commands may include, but are not limited to programming language and computer code. The interface can be, for example, a command line interface, a graphical user interface (GUI), a natural user interface (NUI) or a touch user interface (TUI). The device computer 52 preferably includes coding consistency program 66. While not shown, it may be desirable to have the coding consistency program 66 be present on the server computer 54. The device computer 52 includes a set of internal components 800a and a set of external components 900a, further illustrated in FIG. 2.

Figure 2:
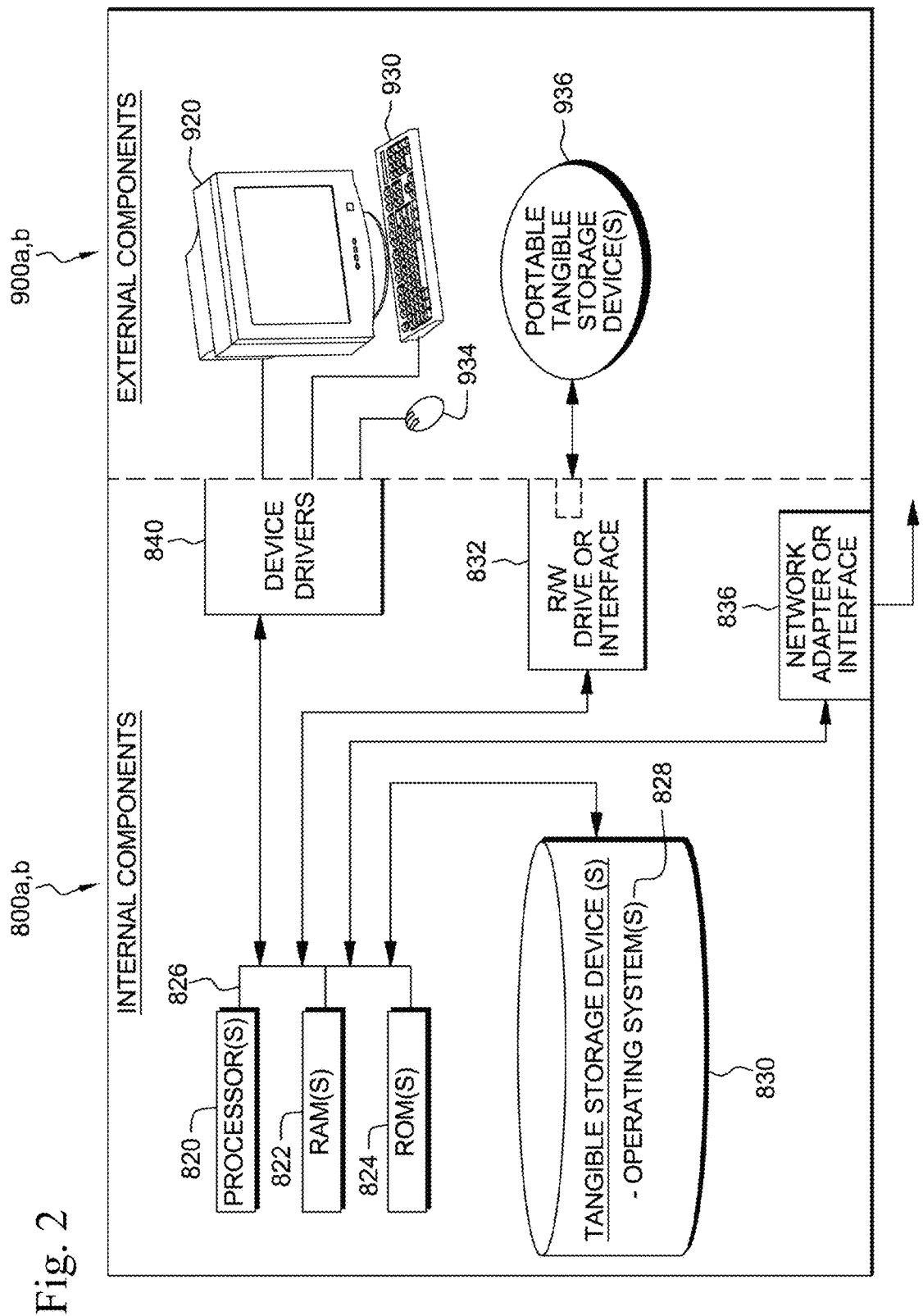
FIG. 2 illustrates internal and external components of a client computer and a server computer in which illustrative embodiments may be implemented.

Server computer 54 includes a set of internal components 800b and a set of external components 900b illustrated in FIG. 2. In the depicted example, server computer 54 provides information, such as boot files, operating system images, and applications to the device computer 52. Server computer 54 can compute the information locally or extract the information from other computers on network 50. The server computer 54 also has a cognitive redundant coding system 67. The cognitive redundant coding system 67 preferably includes a query engine and is in communication with an enterprise repository including a corpus of code, for example repository 53. The server computer 54 may contain the coding consistency program 66. The server computer 54 and the cognitive redundant coding system 67 may be in communication with repositories other than an enterprise repository 53, which contain open source code from other external sources. The cognitive redundant coding system 67, while not shown, may be present on the device computer 52.

Program code and programs such as coding consistency program 66 may be stored on at least one of one or more computer-readable tangible storage devices 830 shown in FIG. 2, on at least one of one or more portable computer-readable tangible storage devices 936 as shown in FIG. 2, or on repository 53 connected to network 50, or may be downloaded to a device computer 52 or server computer 54, for use. For example, program code and programs such as coding consistency program 66 may be stored on at least one of one or more storage devices 830 on server computer 54 and downloaded to device computer 52 over network 50 for use. Alternatively, server computer 54 can be a web server, and the program code, and programs such as coding consistency program 66 may be stored on at least one of the one or more storage devices 830 on server computer 54 and accessed device computer 52. In other exemplary embodiments, the program code, and programs such as coding consistency program 66 may be stored on at least one of one or more computer-readable storage devices 830 on device computer 52 or distributed between two or more servers.

In the depicted example, network data processing system 51 is the Internet with network 50 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, governmental, educational and other computer systems that route data and messages. Of course, network data processing system 51 also may be implemented as a number of different types of networks, such as, for example, an intranet, local area network (LAN), or a wide area network (WAN). FIG. 1 is intended as an example, and not as an architectural limitation, for the different illustrative embodiments.

FIG. 2 illustrates internal and external components of a device computer 52 and server computer 54 in which illustrative embodiments may be implemented. In FIG. 1, a device computer 52 and a server computer 54 include respective sets of internal components 800a, 800b and external components 900a, 900b. Each of the sets of internal components 800a, 800b includes one or more processors 820, one or more computer-readable RAMs 822 and one or more computer-readable ROMs 824 on one or more buses 826, and one or more operating systems 828 and one or more computer-readable tangible storage devices 830. The one or more operating systems 828 and coding consistency program 66 are stored on one or more of the computer-readable tangible storage devices 830 for execution by one or more of the processors 820 via one or more of the RAMs 822 (which typically include cache memory). In the embodiment illustrated in FIG. 2, each of the computer-readable tangible storage devices 830 is a magnetic disk storage device of an internal hard drive. Alternatively, each of the computer-readable tangible storage devices 830 is a semiconductor storage device such as ROM 824, EPROM, flash memory or any other computer-readable tangible storage device that can store a computer program and digital information.

Each set of internal components 800a, 800b also includes a R/W drive or interface 832 to read from and write to one or more portable computer-readable tangible storage devices 936 such as a CD-ROM, DVD, memory stick, magnetic tape, magnetic disk, optical disk or semiconductor storage device. Coding consistency program 66 can be stored on one or more of the portable computer-readable tangible storage devices 936, read via R/W drive or interface 832 and loaded into hard drive 830.

Each set of internal components 800a, 800b also includes a network adapter or interface 836 such as a TCP/IP adapter card. Coding consistency program 66 can be downloaded to the device computer 52 and server computer 54 from an external computer via a network (for example, the Internet, a local area network or other, wide area network) and network adapter or interface 836. From the network adapter or interface 836, coding consistency program 66 is loaded into hard drive 830. Coding consistency program 66 can be downloaded to the server computer 54 from an external computer via a network (for example, the Internet, a local area network or other, wide area network) and network adapter or interface 836. From the network adapter or interface 836, coding consistency program 66 is loaded into hard drive 830. The network may comprise copper wires, optical fibers, wireless transmission, routers, firewalls, switches, gateway computers and/or edge servers.

Each of the sets of external components 900a, 900b includes a computer display monitor 920, a keyboard 930, and a computer mouse 934. Each of the sets of internal components 800a, 800b also includes device drivers 840 to interface to computer display monitor 920, keyboard 930 and computer mouse 934. The device drivers 840, R/W drive or interface 832 and network adapter or interface 836 comprise hardware and software (stored in storage device 830 and/or ROM 824).

Coding consistency program 66 can be written in various programming languages including low-level, high-level, object-oriented or non object-oriented languages. Alternatively, the functions of a coding consistency program 66 can be implemented in whole or in part by computer circuits and other hardware (not shown).

Figure 3:
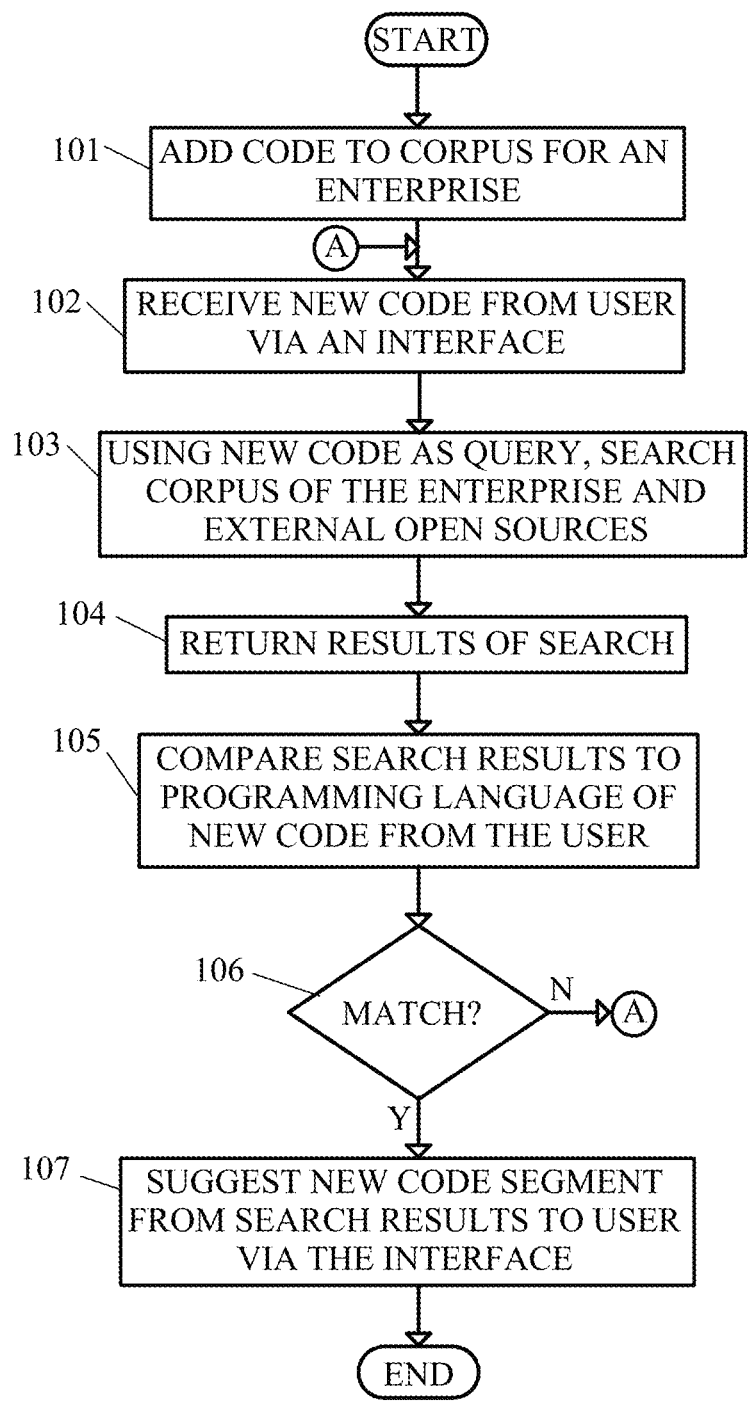
FIG. 3 shows a flow diagram of a method of coding corpus determination.

FIG. 3 shows a flow diagram of a method of coding corpus determination.

In a first step, code is added to a corpus of all code for an enterprise (step 101). The corpus is a cognitive search engine for the organization or enterprise. This code can be either uploaded manually, or be referenced from a code repository within the cognitive redundant coding system. As new code is changed or checked in within the enterprise, the corpus is updated.

The cognitive redundant coding system 67 receives new code from a user via an interface 55 of the device computer 52 (step 102). The interface is preferably within an Integrated Development Environment (IDE).

The cognitive redundant coding system 67 uses the new code received as a query and searches the corpus of the enterprise and other external open sources (step 103).

Preferences can be set across the enterprise or on a per user basis on when to perform the search. For example, preferences could be set to perform the search after the completion of every word (on a space added), after x words, after x lines of code are typed, after a function is identified, or after a call to a third party library is added, or on some other basis.

The cognitive redundant coding system 67 returns results of the search (step 104). The results returned by the cognitive search engine will preferably include, but not limited to: code snippets, class libraries, procedures, scripts, and templates.

The cognitive redundant coding system 67 compares the results of the search to programming language of the new code from the user (step 105). In one embodiment, the first result returned from the cognitive search engine of the cognitive redundant coding system 67 of the query is considered to be the closest match to the entered code segment.

If the search results do not match the new code entered by the user (step 106), the method returns to step 102 of receiving new code from the user via an interface. In other words, if the code typed by the user is the same as the code in the search result, nothing need be done and the system returns to accepting new code from the user. The cognitive redundant coding system 67 can update the corpus with any new code which is not otherwise present.

The match may be based, for example, on one of the following criteria:

A) File name—if the user is typing in a file named "Main.java", and the first result of the search is from a file named "HelloWorld.java", then the ".java" suffix indicates that the two languages are a match.

B) Code structure and constants—if a certain common template is used, does the code follow a certain indentation structure or guideline, and are constants reused and therefore have a common label.

C) Code snippet—There are existing techniques to determine the programming language of a first code snippet.

If the search results match the new code entered by the user (step 106), the cognitive redundant coding system 67 suggests new code segment from search results to the user via the interface (step 107) and the method ends.

The cognitive redundant coding system can suggest a new code segment from the search results, for example using type ahead. The system might also do this by providing a pop-up or other visual display to indicate to the user that existing code which might be useful is available. The cognitive redundant coding system can receive a user to accept or reject the new code segment suggested and if the system receives a response from the user to accept the new code segment, the system replaces the code received from the user with the new code segment. In an embodiment, if the user rejects a recommended code segment as improper, iteratively repeating the method until either (i) a recommendation is accepted or (ii) none of the code segments in the repository are within a threshold of the relevance of the received code. In an embodiment, the code suggested may be based on a decision tree approach for requirements.

Optionally, the cognitive redundant coding system 67 may provide an indication of where that existing code may be found, for example in an internal company repository (perhaps one in another division of the company which the user might not be aware of), or in a third-party library.

Optionally, the cognitive redundant coding system 67 might provide a confidence score of how likely the code snippet is to be the best solution for the coding. This confidence score could be calculated by a method of natural language processing.

Optionally, the cognitive redundant coding system 67 might provide usage analytics to show how the code or similar code is used across the organization. This would aid in maintaining consistency of coding across larger organizations.

Example 1

User1 is writing code in his favorite IDE. He starts writing:

StringBuffer bobstring=new String

The system is triggered and the string "StringBuffer bobstring=new String" is passed to the search corpus.

The first response looks like this:

StringBuilder toreturn=new StringBuilder( )

The system displays this code recommendation to User1.

User1 was not aware that most of his organization was using the function StringBuilder, rather than StringBuffer.

User1 can choose to continue programming as User1 was, or User1 can click a button to accept the changes suggested by the system.

If User1 accepts the changes, this would preferably also change the variable name "bobstring" to the common variable name "toretum" that is used across the organization. With the acceptance of the changes, the system replaces User1's code with:

StringBuilder toreturn=new StringBuilder( )

The system might also suggest that the function could be found in a repository in the Omaha, Nebr., division of the company.

User1 would also have the option to override anything recommended, so they are not required to accept the changes.

When User1 is done, User1 saves and commits the code which is then added to the corpus to be used for future searches.

Example 2

User2 is writing code, and they want to call a module from the npm package manager for JAVASCRIPT to make a request. User2 types:

var request=require("request");

The system takes the string "var request=require("request");" and passes it to the search corpus as a query.

The first result shows:

var rp=require('request-promise');

The system also provides the additional information that 90% of the enterprise's programmers use the name "request-promise", while 10% use "request".

User2 heads over to npmjs.org, the website for the npm software registry, and compares the two names. User2 agrees with the consensus and changes User2's code from "request" to "request-promise".

This allows User2 to make this change at the start of the users's development efforts, rather than coming back after a code review and making those changes much later in the cycle.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

What is claimed is:

1. A computer program product for analyzing code in a programming language, the code being entered by a user into a computer for an enterprise by a computer comprising at least one processor, one or more memories, one or more computer readable storage media, the computer program product comprising a computer readable storage medium having program instructions embodied therewith, the program instructions executable by the computer to perform a method comprising:
   a) receiving, by the computer, the code from the user;
   b) providing, by the computer, the code to a search engine to execute a search of the code received from the user within at least one repository of enterprise-specific code after the code being entered by the user and received by the computer includes a call to a third party library;
   c) receiving, by the computer, at least one result from the search engine, the at least one result comprising at least one enterprise-specific computer code segment;
   d) comparing, by the computer, the programming language used in the at least one result of enterprise-specific code to the programming language of the code entered by the user to determine if there is a match;
   e) if the computer determines that there is a match, displaying, by the computer, a suggested new enterprise-specific code segment to the user from the at least one search result based on a classification and regression decision tree (CART) and relative usage rates among the enterprise's programmers of the code received from the user as compared to the enterprise-specific code;
   f) receiving, by the computer, a response from the user to accept or reject the new enterprise-specific code segment suggested in step (e); and
   g) if the computer receives a response from the user to accept the new enterprise-specific code segment, replacing, by the computer, the code received from the user with the new enterprise-specific code segment.

2. The computer program product of claim 1, wherein a match is present if the programming language is the same between the code received from the user and the at least one search result.

3. The computer program product of claim 1, wherein a match is present if a code snippet of the code received from the user is the same as a code snippet in the at least one result.

4. The computer program product of claim 1, wherein the suggested new enterprise-specific code segment is in the same programming language and performs the same result within the code received from the user.

5. The computer program product of claim 1, wherein the suggested new enterprise-specific code segment displayed to the user further comprises statistics relating to the usage of the recommended code segment across a group of users within the enterprise.

6. The computer program product of claim 1, wherein the computer receives code within an Integrated Development Environment.

7. The computer program product of claim 1, wherein the suggested new enterprise-specific code includes an indication of where the suggested new enterprise-specific code is sourced from within the enterprise.

* * * * *